(No Model.)
A. B. BOWEN.
TIRE TIGHTENER.
No. 495,541. Patented Apr. 18, 1893.
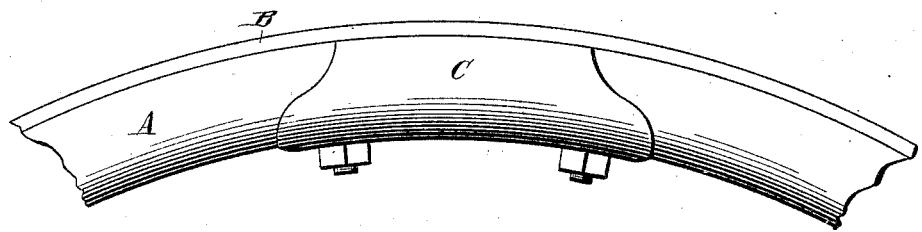
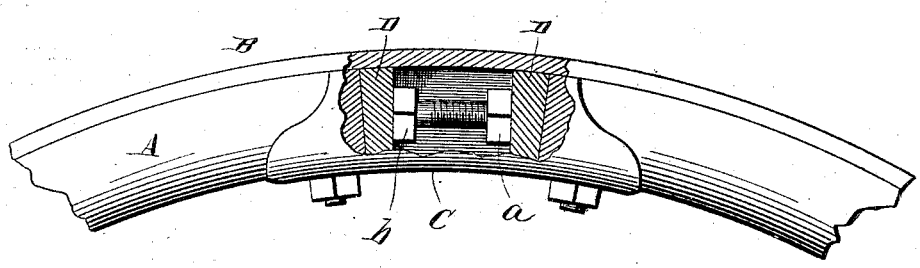
Witnesses:
Edw. H. Deavitt
Geo. W. Long
Inventor:
A. B. Bowen
By J. J. Deavitt
Atty.
THE NORRIS PETERS CO., PHOTO-LITHO., WASHINGTON, D. C.

UNITED STATES PATENT OFFICE.

AZRO B. BOWEN, OF BETHEL, VERMONT.

TIRE-TIGHTENER.

SPECIFICATION forming part of Letters Patent No. 495,541, dated April 18, 1893.

Application filed September 21, 1892. Serial No. 446,497. (No model.)

*To all whom it may concern:*

Be it known that I, AZRO B. BOWEN, a citizen of the United States, residing at Bethel, in the county of Windsor and State of Vermont, have invented a new and useful Improvement in Rim-Expanding Devices, of which the following is a specification.

The accompanying drawing is referred to and made a part of this specification.

The object of my invention is to expand the felly of the wheel to tighten the tire without removing it from the wheel and to contract the same when the tire is to be removed and exchanged for a new tire.

In the drawing A represents the rim or felly of the wheel, B the tire or hoop, C a clip, D D jams, $a$ nut, $b$ expansion bolt with screw to fit nut $a$.

To use my device cut away a small portion of the rim or felly and insert between jams D D the nut $a$— and bolt $b$— then turn bolt $b$ with a wrench or any other device the way to crowd the jams D D farther apart thereby expanding the rim A to any desired extent. The rim of the wheel may be contracted as well as expanded by turning the screw bolt in the opposite direction from that above indicated. After the size of the rim of the wheel is adjusted apply clip C as shown in the drawing which incloses the expanding device securely from dust and mud and keeps the rim of the wheel as strong as it was before my device was inserted or attached to a wheel. The present mode of setting tires to carriage wheels by removing the tire and expanding it by heat after it has been shortened to place on the rim again is expensive. Besides it injures the wheel.

Having described my invention, what I claim as new, and desire to secure by Letters Patent, is—

1. In a device for expanding a wheel-tire, the combination of the movable imperforate jams D D with the felly-sections against which they bear, a nut and bolt which bear against the faces of the said jams, and means of holding the said bolt nut and jams in place for the purpose set forth.

2. In a device for expanding a wheel-tire, the combination of the movable jams D D with the felly-sections against which they bear, a nut and bolt which bear against the faces of the said jams, and a clip C inclosing and protecting the said nut bolt and jams substantially as and for the purpose set forth.

AZRO B. BOWEN.

Witnesses:
T. J. DEAVITT,
EDW. H. DEAVITT.